(12) United States Patent
Maiyuran et al.

(10) Patent No.: US 7,136,992 B2
(45) Date of Patent: Nov. 14, 2006

(54) METHOD AND APPARATUS FOR A STEW-BASED LOOP PREDICTOR

(75) Inventors: Subramaniam Maiyuran, Gold River, CA (US); Peter J. Smith, Folsom, CA (US); Stephan Jourdan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 491 days.

(21) Appl. No.: 10/739,689

(22) Filed: Dec. 17, 2003

(65) Prior Publication Data

US 2005/0138341 A1   Jun. 23, 2005

(51) Int. Cl.
G06F 9/38 (2006.01)
(52) U.S. Cl. .................. 712/241; 712/236; 712/240
(58) Field of Classification Search ........... 712/236, 712/240, 241
See application file for complete search history.

(56) References Cited

U.S. PATENT DOCUMENTS 6,055,630 A * 4/2000 D'Sa et al. ............... 712/240

OTHER PUBLICATIONS

Evers et al., "Using Hybrid Branch Predictors to Improve Branch Prediction Accuracy in the Presence of Context Switches", Proceedings of the 23rd Annual International Symposium on Computer Architecture, ACM, 1996, pp. 3-11.*
Loh et al., "Predicting Conditional Branches with Fusion-Based Hybrid Predictors", Proceedings of the 2002 International Conference on Parallel Architectures and Compiler Techniques, IEEE, pp. 165-176.*

* cited by examiner

Primary Examiner—William M. Treat
(74) Attorney, Agent, or Firm—Blakely, Sokoloff, Taylor & Zafman LLP (57) ABSTRACT

A method and apparatus for a loop predictor for predicting the end of a loop is disclosed. In one embodiment, the loop predictor may have a predict counter to hold a predict count representing the expected number of times that a predictor stew value will repeat during the execution of a given loop. The loop predictor may also have one or more running counters to hold a count of the times that the stew value has repeated during the execution of the present loop. When the counter values match the predictor may issue a prediction that the loop will end.

36 Claims, 5 Drawing Sheets

METHOD AND APPARATUS FOR A STEW-BASED LOOP PREDICTOR

FIELD

The present disclosure relates generally to microprocessor systems, and more specifically to microprocessor systems with instruction fetch units capable of predicting sequences of instructions.

BACKGROUND

Processors may fetch instructions from various sources of instructions that may hold instructions. A source of instructions may be a traditional cache, a trace cache, an instruction buffer, or even just system memory. One recent form of a cache is the trace cache. Rather than storing macro-instructions as is done in other caches, the trace cache contains sequences of previously-decoded micro-operations (micro-ops) of macro-instructions. The sequence of micro-ops may be stored in a sequence of set and way locations in the trace cache called a trace, where the micro-ops at a given set and way location may be called a traceline or trace element. Then, in further cases of executing the particular macro-instruction, decoding is not necessary and the sequence of micro-ops may be accessed from the corresponding trace in the trace cache.

Along with the use of caches, processors may further enhance processing throughput by using branch predictors. Often which direction is to be taken subsequent to a branch instruction is not known until the instruction reaches the execution stage at the very end of the pipeline. Not knowing the direction following the branch instruction would require that the pipeline be stalled until after the branch instruction executes, which would severely impact performance. For this reason, processor designers may use one or more branch predictors that predict, during the early stages of a pipeline, which direction the branch is likely to take. The pipeline may then be kept full, and the predicted direction may be compared with the actual direction at execution time. Only if a misprediction occurs does the pipeline need to be flushed and the instructions re-executed.

Several varieties of branch predictors may be used, and in some cases several may be used and a mechanism may be used to select a prediction from among several proffered. A bimodal predictor may make a prediction based upon recent history of a particular branch's execution, and give a prediction of usually taken or usually not-taken. A global predictor may make a prediction based upon recent history of all the branches' execution, not just the particular branch of interest. In some cases the global predictor may hash together recent history (taken or not taken) along with a portion of the address (linear instruction pointer) involved for the branches to form what may be called a "stew". Using the current stew values for prediction may give good results with branches that are dependent on the direction of previous branches.

Neither the bimodal nor the global predictor perform well with branches used in loops. Note that a loop may be coded so that the loop direction may be either the taken or the not-taken direction of the branch. Therefore the present disclosure uses the terminology "loop direction" and "not loop direction" as indicating alternately the branch taken or not-taken directions depending upon the coding of the loop. The bimodal predictor may simply predict loop direction and mispredict the end of the loop (fall-through, e.g. not loop direction). The global predictor, using a stew value, may also mispredict the end of the loop. With a long enough loop, the hashing used to form the stew may end up giving a constant or constantly-repeating value for the stew. Using more stew bits may extend the usefulness of the global predictor but at a substantial cost in terms of circuit complexity and also in the time required to initially train the predictor.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following description describes techniques for predicting the branch instruction that causes an end of a loop. In the following description, numerous specific details such as logic implementations, software module allocation, bus signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. The invention is disclosed in the form of a processor, such as the Pentium 4® class machine made by Intel® Corporation, that may use trace caches. However, the invention may be practiced in other forms of processors that may or may not use trace caches. Furthermore, the invention is specifically disclosed in the form of a loop predictor for trace caches, but the invention may be practiced in other embodiments where loop prediction may be used, such as processors that use other sources of instructions (traditional caches, instructions buffers, or system memory).

Figure 1:
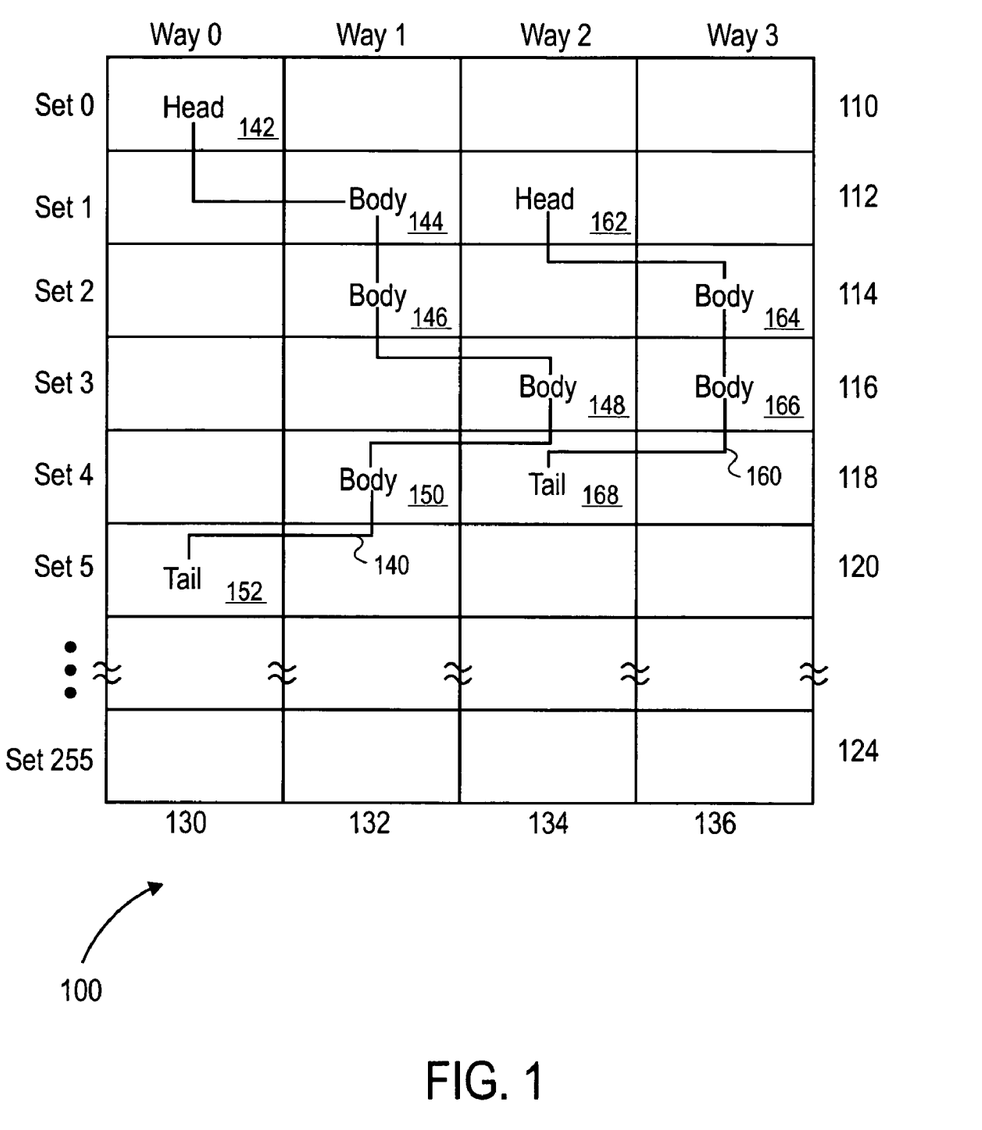
FIG. 1 is a schematic diagram of traces in a trace cache, according to one embodiment.

Referring now to FIG. 1, a schematic diagram of traces in a trace cache is shown, according to one embodiment. FIG. 1 illustrates traces 140, 160 of one embodiment, in the context of an 4-way, 256-set embodiment of trace cache array 100 storing instructions that are decoded micro-ops of macro-instructions. Each storage location in the array, called a data line, may be identifiable by a set number and way number. Based on the descriptions to follow, those skilled in the art will appreciate that other sizes of set-associate caches, as well as non-set-associate caches, may be employed in other embodiments. Moreover, the instructions may be instructions of any kind.

For ease of further discussion, the first trace element of a trace 140 may be referred to as a trace head, or head 142; the last trace element of a trace being referred to as a trace tail, or tail 152; and the intermediate trace elements being referred to as trace bodies, or bodies 144, 146, 148, 150. In the degenerate case of a two-element trace, the second trace element is a trace body as well as a trace tail, and in the degenerate case of a single element trace, the singular trace element is a trace head, a trace segment body, as well as a trace tail at the same time.

In the FIG. 1 embodiment, a location address may be maintained for each traceline (or trace element) storing the first trace element of a trace. The traceline (or trace element) storing the first trace element of a trace may be located by address matching an access address against the location addresses maintained. Furthermore, the address matching may be performed using a subset of the address bits, and a matching traceline may be validated as to whether the indeed contains the first trace element being sought. Additionally, storing of trace elements is further qualified with a criteria of ensuring the address matching subset of the location addresses maintained in association with the various ways of a traceline set, if any, is unique. In one embodiment, the location address for the traceline may be a set number and a way number. In another embodiment, other trace elements may also be associated with memory addresses. In yet another embodiment, address matching may be performed using all address bits.

Partial control information sequentially associating each traceline (or trace element) storing a trace body or tail with its predecessor traceline in a logical manner may be maintained. Similarly, partial control information sequentially associating each traceline storing a trace head or body with its successor traceline in a logical manner may also be maintained. The successive tracelines of a multi-line trace are located, relying in part on the partial sequential association control information maintained. More specifically, for each traceline storing a trace body or tail, a way index indexing into a way of the set of the predecessor traceline may be maintained, and for each traceline storing a trace head or body, a way index indexing into a way of the set of the successor traceline may be maintained. Additionally, a predetermined set relationship between the successive data lines of a multi-line trace may be maintained.

Although a trace cache 100 has been described in detail, the present disclosure encompasses other processors with traditional caches, instruction buffers, or even system memory as sources of instructions.

Figure 2:
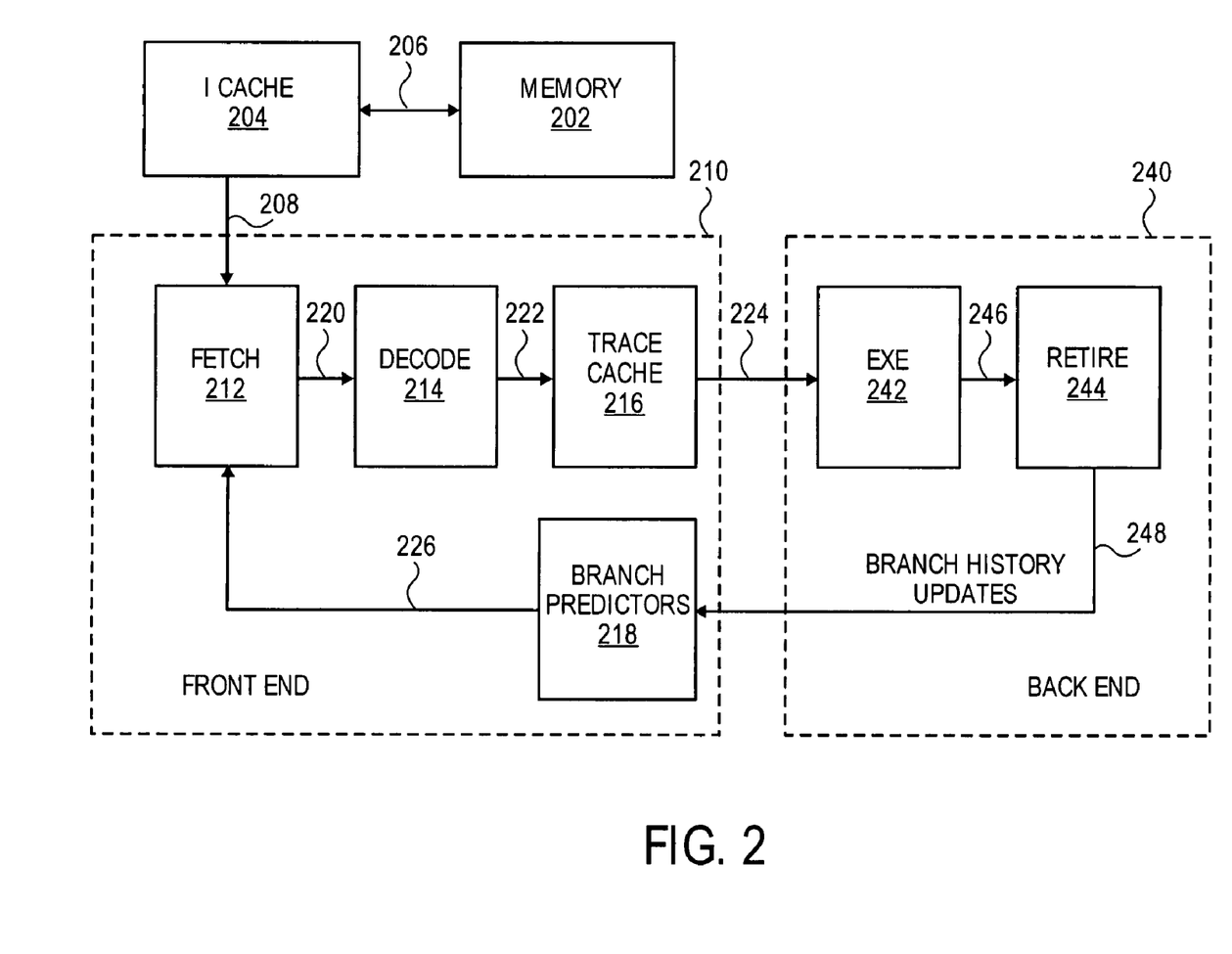
FIG. 2 is a schematic diagram of a processor including a trace cache and predictors, according to one embodiment.

Referring now to FIG. 2, a schematic diagram of a processor including a trace cache and predictors is shown, according to one embodiment. The processor may be divided into a front end 210 that principally is concerned with fetching and decoding macro-instructions, and a back end 240 that is principally concerned with executing the decoded macro-instructions and updating the machine state (retirement).

Within front end 210 there may be a fetch 212 circuit for fetching macro-instructions from an instruction cache 204 and memory 202. The fetch 212 may pass on the macro-instructions for decoding into micro-operations (micro-ops) in a decode 214 circuit, which then may place the decoded micro-ops into traces in a trace cache 216. Micro-ops from trace cache 216 may be sent on to execution 242, in some cases speculatively, with branch instructions predicted by a set of branch predictors 218. The branch predictors 218 may make predictions for use by the fetch 212 circuit or by the trace cache 216.

The back end 240 may receive the decoded micro-ops from the front end 210 and execute them in execution 242, which may include one or more execution units. The retirement 244 circuitry may determine whether any speculative instructions were properly executed, and update the processor state for non-speculative instructions and for properly executed speculative instructions. Part of the functions of retirement 244 may be to send branch history updates 248 to the branch predictors 218 so that the branch predictors 218 may compare predictions made with the results at retirement. Although a trace cache 216 has been described in detail as a source of instructions, the present disclosure encompasses in other embodiments other processors with traditional caches, instruction buffers, or even system memory as sources of instructions. In some embodiments, a traditional cache or instruction buffer may be located in front of decode 214 circuit as a source of instructions.

Figure 3:
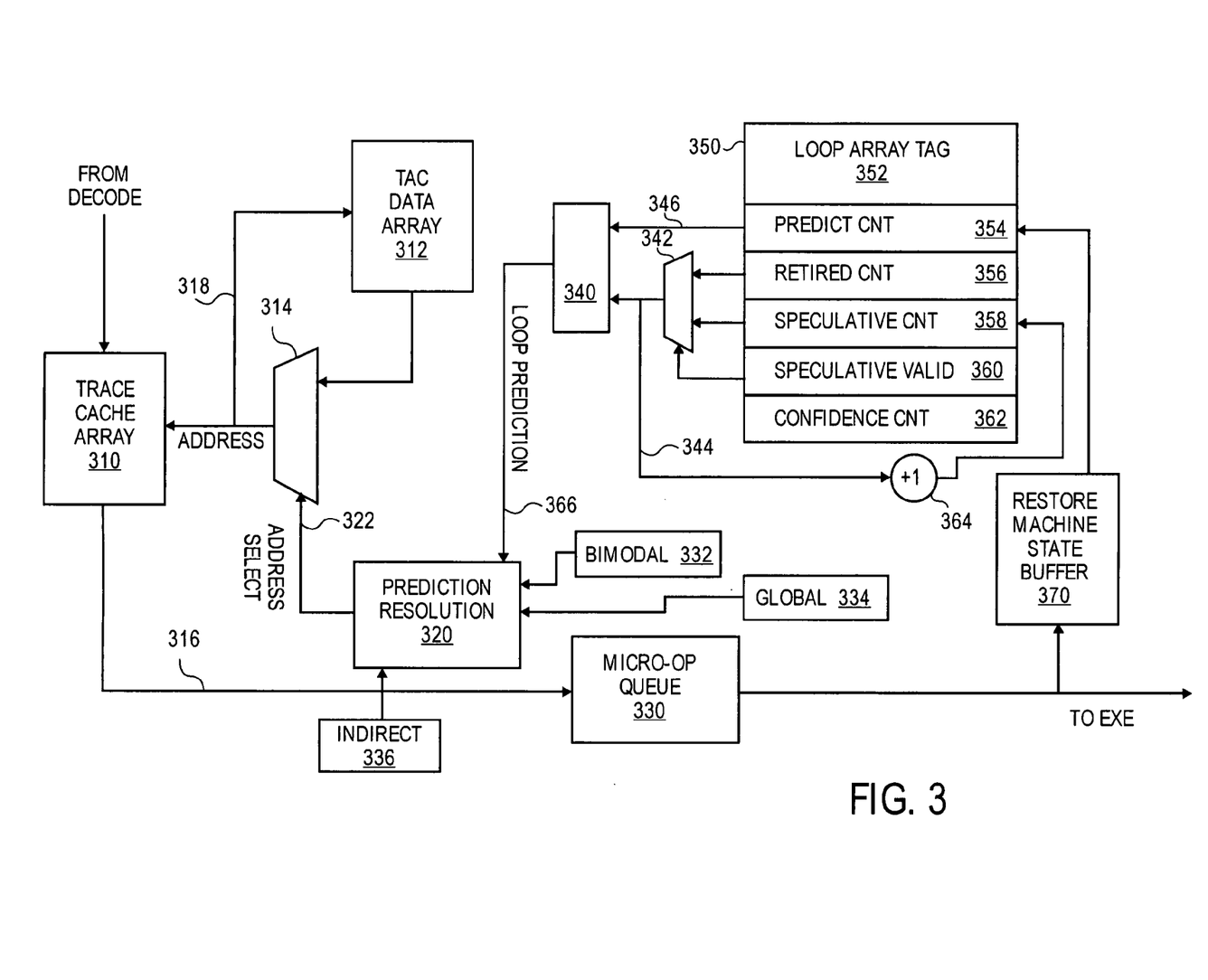
FIG. 3 is a schematic diagram of a trace cache and associated loop predictor, according to one embodiment of the present disclosure.

Referring now to FIG. 3, a schematic diagram of a trace cache and associated loop predictor is shown, according to one embodiment of the present disclosure. The trace cache array 310 is shown receiving micro-ops from a decode stage, and outputting micro-ops to an execution stage via a micro-op queue 330. Trace cache array 310 may be addressed via an address mux 314 that may select from one or more address sources. In other embodiments, other sources of instructions may be used, such as traditional caches or instruction buffers. In the FIG. 3 embodiment, only addresses from a target address cache (TAC) data array 312 are shown, but it is to be expected that several other sources of addresses may be used. The TAC data array 312 may include a full address (linear address pointer) for traces within trace cache array 310, including any end of the loop addresses (fall-through addresses, e.g. next instruction if branch in the not loop direction). In the case of a loop predictor, it is noteworthy that a loop may be coded either with a branch being taken or not taken as being in the direction of the loop, so this disclosure will use the terminology "loop direction" and "not loop direction" to mean either branch taken or branch not taken depending upon the precise coding of the loop in question.

FIG. 3 also shows a set of branch predictors, including a bimodal branch predictor 332, a global branch predictor 334, and an indirect branch predictor 336. Also shown are circuits that together may form another branch predictor, which may collectively be called a "loop predictor": loop array 350, switch 342, compare circuit 340, and incrementor 364. In other embodiments, other combinations of circuits may be used to form a loop predictor. The loop predictor may produce a loop prediction signal 366, which may present a logic level that represents a prediction that the loop has ended and that the not loop direction address should be issued to the trace cache array 310. One of the various predictions from the branch predictors may be selected by a prediction resolution 320 circuit that may select according to some form of rule. In one embodiment, the prediction resolution 320 circuit may give priority to a loop prediction 366 over that given by a global predictor 334, and in turn give priority to a prediction given by a global predictor 334 over that given by a bimodal predictor 332.

The loop predictor may operate as an enhancement to a global predictor 334 that calculates values of a stew. Recall that a shortcoming of a stew-based global predictor was that the hashing used to form the stew may end up giving a constant or constantly-repeating value for the stew during the execution of a long loop, and thereby cause mispredictions. The loop predictor may not attempt to determine directly how many times the loop will execute before ending, but instead may determine how many times the stew will repeat in value before the loop will end. In one embodiment; a loop predictor may learn an expected number of times the stew will repeat in value during the execution of a loop, called a predict count, based upon program execution history. Then, during each subsequent execution of the loop, a running count of the number of times that the stew value is observed to repeat is kept. Here "running count" may mean that the running count starts at zero at the beginning of the current execution of the loop and increments on the fly each time the stew value is observed to repeat (or stay at a constant value). When the running count matches the predict count during a particular execution of the loop, the end of that loop may be predicted.

In the FIG. 3 embodiment, a loop array 350 may include a set of counters to hold the predict count and one or more running counters for each branch under consideration. For the sake of clarity, only the counters for one branch are shown within the loop array 350 in FIG. 3, but additional counters to support more branches could be added by simple repetition. A predict counter 354 may be used to store a predict count. A pair of counters, retired counter 356 and speculative counter 358, may be used to store different aspects of the running count. In other embodiments, one counter or more than two counters may store different aspects of the running count. Either the retired count or the speculative count may be selected by switch 342 to serve as the running count 344, depending upon the status of speculative valid 360. A compare circuit 340 may compare the values of the predict count 346 with that of the running count 344. When the running count 344 equals the predict count 346, the compare circuit 340 may issue a loop prediction 366 that the loop has ended and that the not loop direction address should be issued to the trace cache array 310.

The predict counter 354 may be trained to contain the proper value of predict count during the first several executions of a particular loop. The proper value would be the number of times that the stew value would repeat before the end of the loop. In one embodiment, during a training mode the predict count may be set equal to the retired count when both the branch in question is not loop direction (fall through) and the retired count is not zero. This value of predict count may then be used in subsequent executions of the loop.

The retired counter 356 may be incremented upon observation of stew value repetitions at the time when the retirement stage sends branch history updates following the retirement of instructions whose execution has actually been deemed valid. Speculative counter 358 in contrast may be incremented by stew value repetitions determined at the time when the micro-ops are issued from the trace cache array 310 to the micro-op queue 330. As at this point the execution of the micro-ops may be speculative, mispredictions may occur. For this reason the speculative count in speculative counter 358 may over-count those repetitions of the value of the stew. Mispredictions may be used to set the value of speculative valid 360 to invalid. When this happens, the retired count may be used as the running count 344 and the value of retired count may be copied into speculative counter 358 for further use. In one embodiment, the value of the running count 344 may be incremented by incrementor 364 each time the value of the stew repeats, and the result used to update the speculative counter 358.

The loop array 350 may also include a confidence counter 362. The value of the confidence counter 362 may represent how many times the loop repeats with the same predict count value. In one embodiment, the confidence counter 362 may be incremented when the retired count equals the predict count subsequent to the branch being in the not loop direction. When the retired count does not equal the predict count subsequent to the branch being in the not loop direction, the confidence counter 362 may be decremented.

The loop array 350 could include the complete fall-through (not loop direction) address. However, in one embodiment the loop array 350 may instead include a tag 352 which may point to the actual fall-through address contained in the TAC data array 312. The use of the tag 352 may lower the circuit complexity when compared with storing the entire fall through address.

In order to initialize an entry in the loop array 350 for a given branch instruction, a misprediction of a conditional branch may be used as an initiating event. Then an entry for the branch may be found by some rule, such as a last-recently-used (LRU) algorithm. In some embodiments, the algorithm may consider whether the entries are in a predict mode or in a learning mode, and may replace one in learning mode first. A pseudo-code representation of the process of initializing the entry may be as follows.

```
if (TBPU_update && conditional_branch && mispredicted) {
        index = get_index(retirement_stew); // bits 8..13
        tag = get_tag(retirement_stew);     // all other bits
        set = index ^ head_set;
        loop_entry = loop_array(set, tag);
        if (!loop_entry) {
                loop_entry = LRU(set); //apply allocation algorithm
        }
        loop_entry.predict_count = retire_count =
        spec_count = 0; //set counters to 0
        loop_entry.loop_entry_valid = true;
        loop_entry.loop_tid = tid;
        loop_entry.loop_tag = tag;
        loop_entry.loop_confidence = 1;       // Learn mode
        loop_entry.initial_direction = loop_direction;
}
```

Here the TBPU is the trace-cache branch prediction units, and TBPU updates refers to the branch history updates, including stew values, being sent from the retirement to the branch predictors. The variable retire_count is the retired count, the variable spec_count is the speculative count, and the variable predict_count is the predict count.

A given entry in the loop array may be deallocated when the predict count exceeds some threshold, such as the maximum number of bits set aside for predict count. All of the entries may be deallocated when the trace cache is cleared (TCclear).

Additional details of one embodiment of incrementing a speculative count may be found in the following pseudo-code.

```
if (TBPU_prediction_time && conditional_branch &&
loop_entry_valid) {
        loop_spec_count =
        get_spec_count(loop_entry) + 1;
        loop_spec_valid = true;
}
```

Here the incrementing takes place at TBPU_prediction_time, when the prediction is made at the time of issuance of the micro-ops to the micro-op queue. On a pipeline reset event, which may be called a jeclear, nuke, or reset event, all speculative counts may be marked invalid.

```
if (jeclear || ujeclear || nuke || reset) {
        foreach loop_entry {
                loop_spec_valid = false;
}}
```

Figure 4:
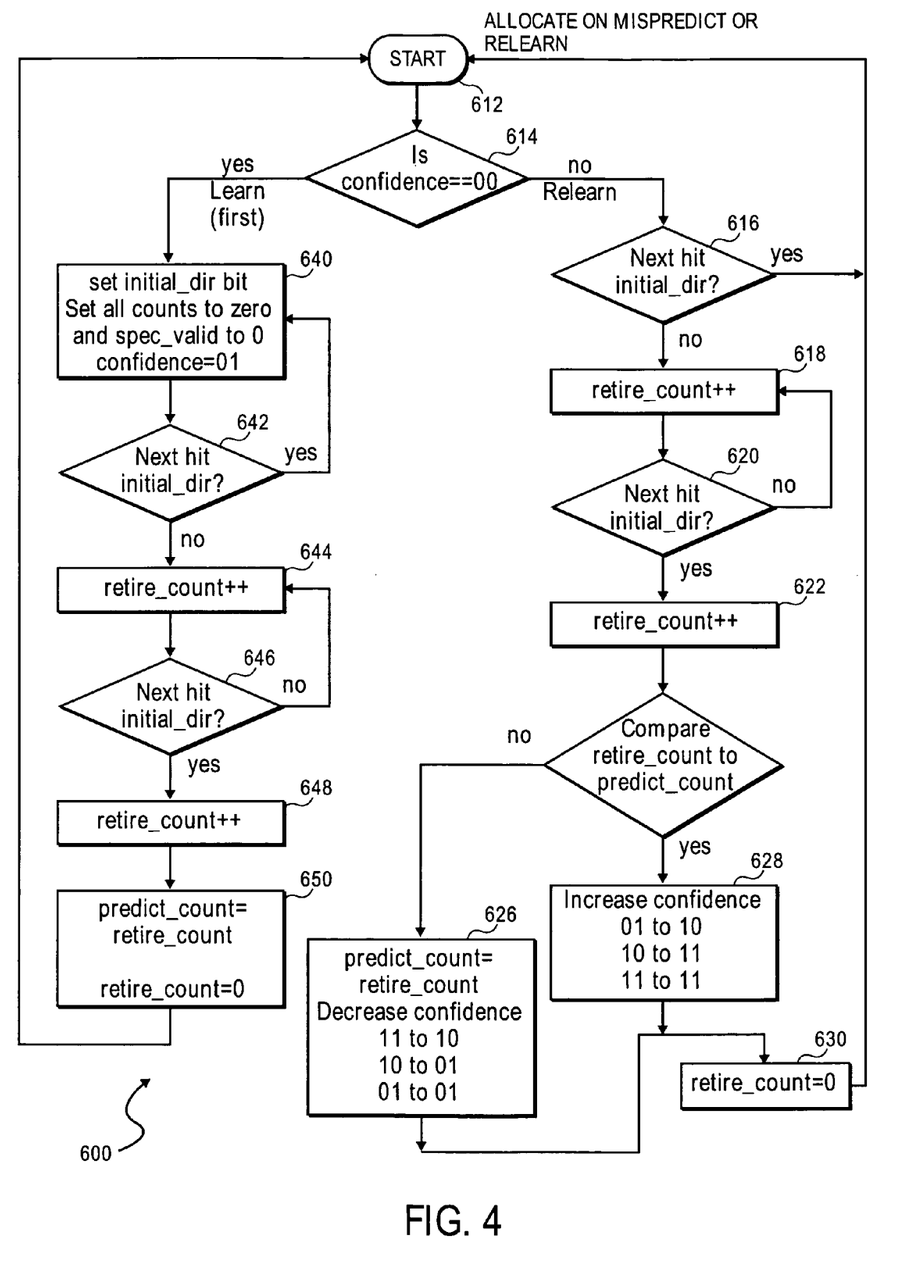
FIG. 4 is a flowchart showing a method of learning and relearning for loop predictor counters, according to one embodiment of the present disclosure.

Referring now to FIG. 4, a flowchart showing a method of learning and relearning for loop predictor counters is shown, according to one embodiment of the present disclosure. The process starts in the start block 612, when the given entry in the loop array may be initialized for the branch instruction in question. Then in decision block 614 it may be determined whether the confidence count is zero. If so, the decision block 614 exits along the YES path and the process enters the learning (or training) mode.

In the learning mode, when going through the execution of the loop for a first time, at block 640 the process may initialize the predict counter, the retired counter, the speculative counter, and the speculative valid to zero. The confidence counter may be set to one. Then in decision block 642 it may be determined whether or not the next "hit" (execution of the branch instruction when the stew value repeats) results in a not loop direction (fall through) result. If so, then decision block 642 exits via the YES path and the process re-enters the initializing of block 640. If, however, the next hit results in a loop direction result, then decision block 642 exits via the NO path and the process increments the retired count at block 644.

Then in decision block 646 it may be determined whether or not the next "hit" results in a not loop direction (fall through) result. If not, then decision block 646 exits via the NO path and the process re-enters block 644 where it again increments the retired count. After the loop executes the required number of times, the decision block 646 exits via the YES path and the process increments the retired count one last time in block 648. Then in block 650 the predict count is set equal to the resulting retired count, and then the retired count is reset to zero. In this manner the predict count may be set to an expected number of times the stew value will repeat. In other embodiments, other techniques may be used to set the predict count. The learning (or training) mode may then return to the start block 612 for further execution in predict mode or re-learn mode, or both.

The process may again start in the start block 612. Then in decision block 614 it may be determined whether the confidence count is zero. If not, then decision block 614 exits along the NO path and the process enters the relearn mode. The relearn mode may be performed in parallel with the predict mode (not shown in FIG. 4): however, the relearn mode makes use only of retirement values and thus may generally make its determinations at a later time than the predict mode can.

At decision block 616 the determination may be made whether the first hit is in the not loop direction (fall through). If so, then decision block 616 exits via the YES path, and the process aborts and returns to start block 612. If not, then decision block 616 exits via the NO path and the retired count is incremented at block 618. At decision block 620, the determination may be made whether a subsequent hit is in the not loop direction (fall through). If not, then decision block 620 exits via the NO path and the retired count is again incremented in block 618. If so, then decision block 620 exits via the YES path, and the retired count is incremented for a final time in block 622.

In decision block 624, the current value of retired count is compared with the predict count. If the current value of predict count properly represents the number of times that the stew value will repeat during loop execution, the retired count at the end of the loop should match the predict count. So if the determination of decision block 624 is that they match, then decision block 624 exits via the YES path and the confidence count is increased in block 628. If the determination of decision block 624 is that they do not match, then the decision block 624 exits via the NO path and the confidence count is decreased in block 626. (In one embodiment the confidence counter may be a two-bit saturating counter). In either case, the process resets the value of retired count in block 630 before returning to the start block 612.

Figure 5:
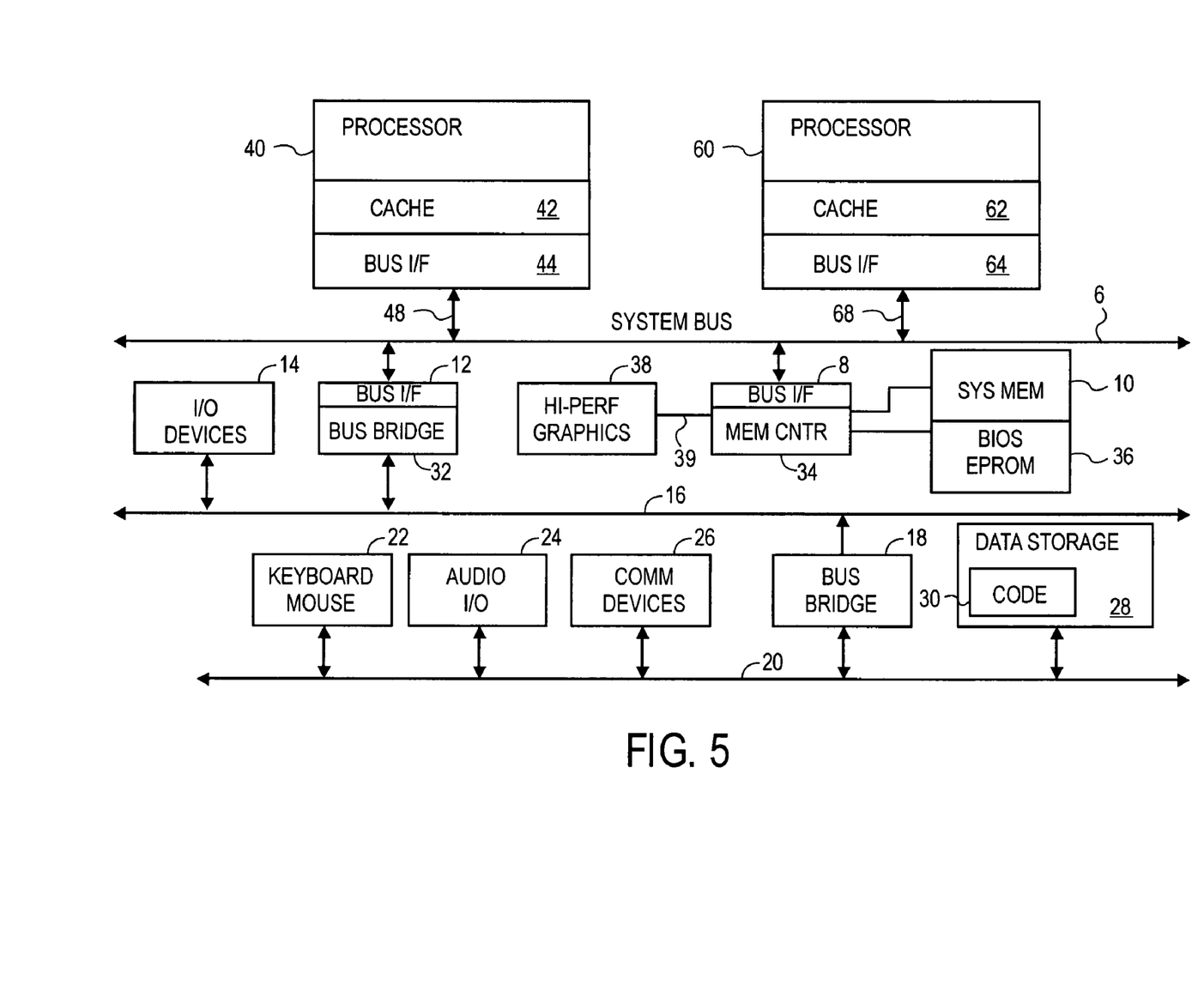
FIG. 5 is a schematic diagram of a processor system, according to one embodiment of the present disclosure.

Referring now to FIG. 5, a schematic diagram of a processor system is shown, according to one embodiment of the present disclosure. The FIG. 5 system may include several processors of which only two, processors 40, 60 are shown for clarity. Processors 40, 60 may include the trace cache array 310 and loop predictor of FIG. 3. In other embodiments, processors 40, 60 may include other forms of sources of instructions, such as traditional caches or instruction buffers, as well as a loop predictor. The FIG. 5 multi-processor system may have several functions connected via bus interfaces 44, 64, 12, 8 with a system bus 6. In one embodiment, system bus 6 may be the front side bus (FSB) utilized with Pentium 4® class microprocessors manufactured by Intel® Corporation. A general name for a function connected via a bus interface with a system bus is an "agent". Examples of agents are processors 40, 60, bus bridge 32, and memory controller 34. In some embodiments memory controller 34 and bus bridge 32 may collectively be referred to as a chipset. In some embodiments, functions of a chipset may be divided among physical chips differently than as shown in the FIG. 5 embodiment.

Memory controller 34 may permit processors 40, 60 to read and write from system memory 10 and from a basic input/output system (BIOS) erasable programmable read-only memory (EPROM) 36. In some embodiments BIOS EPROM 36 may utilize flash memory. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port AGP interface, or an AGP interface operating at multiple speeds such as 4×AGP or 8×AGP. Memory controller 34 may direct read data from system memory 10 to the high-performance graphics circuit 38 across high-performance graphics interface 39.

Bus bridge 32 may permit data exchanges between system bus 6 and bus 16, which may in some embodiments be a industry standard architecture (ISA) bus or a peripheral component interconnect (PCI) bus. There may be various input/output I/O devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
   a source of instructions to store a set of instructions;
   a loop predictor to predict when a branch of said set of instructions will be not loop direction, to include a predict counter to hold a predict count corresponding to a number of times a stew value was repeated during a previous execution of a loop bounded by said branch, and to include a running counter to hold a running count of a number of times said stew value has been repeated during a current execution of said loop.

2. The apparatus of claim 1, further comprising a compare circuitry to issue a prediction when said running count matches said predict count.

3. The apparatus of claim 1, wherein said predict count is trained by results from a pipeline retirement stage.

4. The apparatus of claim 1, wherein said running counter includes a retired counter to hold a retired count.

5. The apparatus of claim 4, wherein said retired count is incremented responsive to when a value of said stew repeats.

6. The apparatus of claim 4, wherein said predict count is set equal to said retired count after said branch is not loop direction when said retired count is not zero.

7. The apparatus of claim 4, wherein said running counter further includes a speculative counter to hold a speculative count incremented when instructions of said set of instructions are issued from said source of instructions and a value of said stew repeats.

8. The apparatus of claim 7, wherein said speculative count is set to said retired count when said speculative count is not valid.

9. The apparatus of claim 7, further including a switch to select between said speculative count and said retired count responsive to a speculative valid signal.

10. The apparatus of claim 1, further including a confidence counter to hold a confidence count incremented when said predict count equals said running count and when said branch is not loop direction.

11. A method, comprising:
    storing a predict count of the number of times a stew value repeats between a first occurrence of a branch not loop direction and a second occurrence of said branch not loop direction;
    maintaining a running count of the number of times a stew value repeats subsequent to a third occurrence of a branch not loop direction; and
    predicting a fourth branch not loop direction when said running count matches said predict count.

12. The method of claim 11, further comprising training said predict count by results from a pipeline retirement stage.

13. The method of claim 11, wherein said maintaining said running count includes maintaining a retired count.

14. The method of claim 13, further comprising incrementing said retired count responsive to when a value of said stew repeats.

15. The method of claim 14, further comprising setting said predict count to said retired count at said second occurrence when said retired count is not zero.

16. The method of claim 14, wherein said maintaining said running count includes maintaining a speculative count incremented when instructions are issued from a source of instructions and a value of said stew repeats.

17. The method of claim 16, wherein speculative count is set to said retired count when said speculative is not valid.

18. The method of claim 16, further comprising selecting said running count from said retired count and said speculative count responsive to whether said speculative count is valid.

19. The method of claim 11, further comprising incrementing a confidence count when said predict count equals said running count and when said branch is not loop direction.

20. A system, comprising:
    a processor including a source of instructions to store a set of instructions, and a loop predictor to predict when a branch of said set of instructions will be not loop direction, to include a predict counter to hold a predict count corresponding to a number of times a stew value was repeated during a previous execution of a loop bounded by said branch, and to include a running counter to hold a running count of a number of times said stew value has been repeated during a current execution of said loop;
    an interface coupled to said processor; and
    an audio input/output coupled to said interface and said processor.

21. The system of claim 20, further comprising a compare circuitry to issue a prediction when said running count matches said predict count.

22. The system of claim 21, wherein said predict count is trained by results from a pipeline retirement stage.

23. The system of claim 21, wherein said running counter includes a retired counter to hold a retired count.

24. The system of claim 23, wherein said retired count is incremented responsive to when a value of said stew repeats.

25. The system of claim 24, wherein said predict count is set equal to said retired count after said branch is not loop direction when said retired count is not zero.

26. An apparatus, comprising:
    means for storing a predict count of the number of times a stew value repeats between a first occurrence of a branch not loop direction and a second occurrence of said branch not loop direction;
    means for maintaining a running count of the number of times a stew value repeats subsequent to a third occurrence of a branch not loop direction; and
    means for predicting a fourth branch not loop direction when said running count matches said predict count.

27. The apparatus of claim 26, further comprising means for training said predict count by results from a pipeline retirement stage.

28. The apparatus of claim 27, wherein said means for maintaining said running count includes means for maintaining a retired count.

29. The apparatus of claim 28, further comprising means for incrementing said retired count responsive to when a value of said stew repeats.

30. The apparatus of claim 28, further comprising means for setting said predict count to said retired count at said second occurrence when said retired count is not zero.

31. The apparatus of claim 28, wherein said means for maintaining said running count includes means for maintaining a speculative count incremented when instructions are issued from a source of instructions and a value of said stew repeats.

32. The apparatus of claim 31, wherein said speculative count is set to said retired count when said speculative is not valid.

33. The apparatus of claim 31, further comprising means for selecting said running count from said retired count and said speculative count responsive to whether said speculative count is valid.

34. The apparatus of claim 26, further comprising means for incrementing a confidence count when said predict count equals said running count and when said branch is not loop direction.

35. A processor, comprising: a loop predictor to produce a loop prediction; a global predictor to produce a global prediction; and a prediction resolution circuit to give priority to said loop prediction over said global prediction; wherein said loop predictor predicts when a branch of said set of instructions will be not loop direction, includes a predict counter to hold a predict count corresponding to a number of times a stew value was repeated during a previous execution of a loop bounded by said branch, and includes a running counter to hold a running count of a number of times said stew value has been repeated during a current execution of said loop.

36. The processor of claim 35, further comprising a bimodal predictor to produce a bimodal prediction, wherein said prediction resolution circuit gives priority to said global prediction over said bimodal prediction.

* * * * *